(12) United States Patent
Bartels et al.

(10) Patent No.: US 9,298,184 B2
(45) Date of Patent: Mar. 29, 2016

(54) PROCESS AND DEVICE TO ENABLE OR DISABLE AN AUTOMATIC DRIVING FUNCTION

(71) Applicant: VOLKSWAGEN AG, Wolfsburg (DE)

(72) Inventors: Arne Bartels, Wolfsburg (DE); Andro Kleen, Duisburg (DE); Bernd Dornieden, Braunschweig (DE)

(73) Assignee: VOLKSWAGEN AG, Wolfsburg (DE)

( * ) Notice: Subject to any disclaimer, the term of this patent is extended or adjusted under 35 U.S.C. 154(b) by 0 days.

(21) Appl. No.: 14/528,393

(22) Filed: Oct. 30, 2014

(65) Prior Publication Data

US 2015/0120124 A1    Apr. 30, 2015

(30) Foreign Application Priority Data

Oct. 30, 2013 (DE) .......................... 10 2013 222 048

(51) Int. Cl.
*B60W 50/08* (2012.01)
*G05D 1/00* (2006.01)
*B60W 50/10* (2012.01)
*B60W 50/14* (2012.01)

(52) U.S. Cl.
CPC ............. *G05D 1/0061* (2013.01); *B60W 50/10* (2013.01); *B60W 50/14* (2013.01); *G05D 2201/0213* (2013.01)

(58) Field of Classification Search
CPC combination set(s) only.
See application file for complete search history.

(56) References Cited

U.S. PATENT DOCUMENTS

| 6,259,980 | B1* | 7/2001 | Peck | B60T 7/12 701/24 |
|---|---|---|---|---|
| 8,352,110 | B1 | 1/2013 | Szybalski et al. | |
| 2007/0213905 | A1* | 9/2007 | Funk | B60K 28/02 701/45 |
| 2009/0287367 | A1* | 11/2009 | Salinger | G05D 1/0246 D1/246 |
| 2012/0089294 | A1* | 4/2012 | Fehse | B60W 30/06 701/25 |
| 2013/0184926 | A1* | 7/2013 | Spero | B62D 1/28 701/26 |
| 2014/0180523 | A1* | 6/2014 | Reichel | B62D 15/0285 701/23 |
| 2014/0365062 | A1* | 12/2014 | Urhahne | B60W 50/16 701/23 |

FOREIGN PATENT DOCUMENTS

| DE | 102005050310 A1 | 6/2006 |
|---|---|---|
| DE | 112006002892 T5 | 11/2008 |
| DE | 102009033752 A1 | 1/2011 |
| DE | 102009048954 A1 | 4/2011 |
| DE | 102012002823 A1 | 9/2012 |

\* cited by examiner

*Primary Examiner* — Edward J Pipala
(74) *Attorney, Agent, or Firm* — Barnes & Thornburg LLP

(57) ABSTRACT

A method and apparatus for activating or deactivating an automatic driving function of a technical system for assisting the driver of a motor vehicle, referred to as pilot below, based on system states of the pilot and between which predefined transitions are possible on the basis of predefined conditions.

12 Claims, 2 Drawing Sheets

PROCESS AND DEVICE TO ENABLE OR DISABLE AN AUTOMATIC DRIVING FUNCTION

PRIORITY CLAIM

This patent application claims priority to German Patent Application No. 10 2013 222 048.0, filed 30 Oct. 2013, the disclosure of which is incorporated herein by reference in its entirety.

SUMMARY

Disclosed embodiments relate to a method for activating or deactivating an automatic driving function of a technical system for assisting the driver of a motor vehicle.

BACKGROUND

A multiplicity of driver assistance systems and assistance functions which are used to assist the driver of the motor vehicle and contribute to increasing the active safety are implemented in modern motor vehicles. An example which may be mentioned at this juncture is ABS which in the meantime has been implemented as standard virtually in every modern motor vehicle.

Driver assistance systems which assist the driver with the lateral guidance of the vehicle, for example the lane-keeping assistant or lane assist, are also known. The latter warns the driver of the unintentional departure from the lane, for example by applying a steering torque. The driver must leave his hands on the steering wheel, which is monitored by the system, for example by measuring the manual steering torque. In this case, use is made of the fact that the mere encompassing and gripping of the steering wheel already induces a manual steering torque.

The further development of the assistance for the driver of a vehicle results in driver assistance systems with semi-automatic through to autonomous driving functions. In such assistance systems, at least some of the driver's responsibility is assumed by the assistance system. An autonomous driving function is implemented, for example, in parking assistants with an automatic parking function.

BRIEF DESCRIPTION OF THE DRAWINGS

Disclosed embodiments are explained below using the drawings, in which.

DETAILED DESCRIPTION OF THE DISCLOSED EMBODIMENTS

Figure 1:
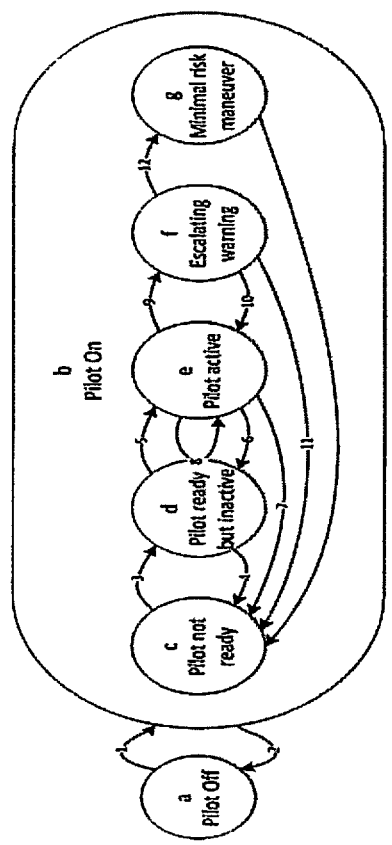
FIG. 1 shows the system state diagram of a technical system for activating and deactivating an automatic driving function.

The method for activating or deactivating an automatic driving function of a technical system for assisting the driver of a motor vehicle, referred to as pilot below, is based on system states which are characteristic of the pilot and between which predefined transitions are possible on the basis of predefined conditions. In this case, the pilot has at least three system states, namely pilot not ready,
pilot ready but inactive, and
pilot active, a transition from the ready but inactive pilot to the active pilot being carried out on request of the driver, a transition from the active pilot to the ready but inactive pilot being carried out on request of the driver, a transition from the active pilot to the pilot which is not ready being carried out by means of a driver braking measure, a steering measure and/or a kick-down measure by the driver, a transition from the ready but inactive pilot to the pilot which is not ready being carried out by means of a driver braking, steering and/or acceleration measure and/or by exceeding predefined limit values with respect to the vehicle behavior and/or the driver behavior, and a transition from the pilot which is not ready to the ready but inactive pilot being carried out if predefined prerequisites for system readiness have been met.

It is possible to safely activate and deactivate the pilot using the at least three system states and the possible transitions, the predefined prerequisites being able to be given, for example, by the compliance with predefined limit values with respect to the vehicle behavior and/or the driver behavior.

The request from the driver to initiate the transition from the pilot ready but inactive state to the pilot active state may be made by actuating an operating unit. In this case, the request from the driver may be, for example, the actuation of a corresponding pushbutton or the actuation of a touch-sensitive surface. However, it may also be a swiping movement of the hand in front of a suitable surface or a voice command.

The pilot may comprise the further system state of escalating driver warning in which the driver is requested to readopt his driver behavior caused by the automatic driving function or to assume the vehicle guidance, a transition from the active pilot system state to the escalating driver warning state being carried out if predefined prerequisites for maintaining the active pilot system state are no longer present. In this case, the predefined prerequisites may be determined by system limits of the pilot and/or by the non-compliance with a driver behavior required by the active pilot. This makes it possible to ensure that, in the event of failure of system components, for example in the event of a defect in a sensor or a control device or the reaching of system limits, the driver is requested to assume the vehicle guidance by the escalating driver warning.

A transition from the escalating driver warning state to the active pilot state may also be carried out if the driver adapts his driving behavior to the driver behavior determined by the active pilot state within a predefined warning time. In this manner, the pilot reverts to the active state again if the driver does not change his behavior owing to the warning, in which case this may be caused by the type of pilot, as will be described later.

A transition from the escalating driver warning to the pilot which is not ready may also be carried out if the driver assumes the vehicle guidance. This ensures that the driver cannot immediately change to the active pilot state again, but rather the pilot is first of all in the not ready state.

The pilot may comprise the further system state of minimal risk maneuver which is used to change the vehicle to a minimal risk state by means of a suitable driving maneuver, a transition from the escalating driver warning system state to the minimal risk maneuver state being carried out if the driver does not assume the vehicle guidance within a predefined warning time, and a transition from the minimal risk maneuver system state to the pilot not ready system state being carried out if the vehicle has been changed to a minimal risk state.

This ensures that the vehicle is automatically changed to a minimal risk state if the driver does not react to the warnings and suggestions to assume the vehicle guidance.

Actuation of the accelerator pedal in the active pilot system state may also cause a transition to the pilot ready but inactive system state, the transition causing a return to the pilot active system state if the accelerator pedal is no longer actuated. Like in modern ACC systems, this makes it possible to briefly override the pilot without deactivating it.

The pilot may also have two superordinate system states, namely the pilot switched on system state and the pilot switched off system state, the transition of switch on pilot and the transition of switch off pilot being possible between the two system states of pilot switched off and pilot switched on. In other words, the system can be switched on and switched off by the driver as necessary.

The pilot may also comprise one or more of the automatic driving functions such as semi-automatic driving, highly automatic driving, fully automatic driving, autonomous driving, semi-automatic parking, highly automatic parking, fully automatic parking, and autonomous parking.

The apparatus for assisting the driver of a motor vehicle is designed and set up to carry out the method described above, having a technical system which comprises an automatic driving function and is referred to as pilot below, the pilot having a predefined number of system states between which predefined transitions are possible, the pilot comprising at least the three system states, namely
pilot not ready,
pilot ready but inactive, and
pilot active.

The apparatus may also comprise a controller for generating control signals for the steering, braking and propulsion actuators, a device for switching the pilot on/off, a device for driver inputs, a device for driver monitoring, a device for outputting information to the driver, an environment monitoring means, a device for determining vehicle parameters, and a navigation device including a digital map. In this case, the navigation device may be set up to receive telematic information and services.

FIG. 1 shows the system state diagram of a disclosed embodiment of a technical system for activating and deactivating an automatic driving function as well as the scheme of interaction between the driver and the technical system. In this case, the functions of semi-automatic, highly automatic and fully automatic driving and parking as well as autonomous driving and parking are combined under automatic driving functions. At the same time, the scheme of interaction between the driver and the system emerges from the system state diagram explained below.

The technical system with its automatic driving function, in other words the pilot, has the following system states:
state a pilot off,
state b pilot on,
state c pilot not ready,
state d pilot ready but inactive,
state e pilot active,
state f escalating warning of the pilot, and
state g minimal risk maneuver.

The transitions 1 to 13 illustrated in FIG. 1 are possible and permissible between the system states. The system states and the transitions are explained in more detail below, in which case, to better explain the interaction between the individual states and transitions, the following explanation begins with the system state d, pilot ready but inactive, that is to say the pilot is in standby.

State d, pilot ready but inactive:

If all of the preconditions for activating the pilot have been met, the system is in the ready state d. This is indicated to the driver in a suitable manner, for example optically by means of a pictogram in the combination instrument.

Transition 4:

If the driver steers sharply or the driver brakes or the driver drives faster than the maximum permissible maximum speed of the pilot or if the driver controls the vehicle in such a manner that it is partially outside the lane or if the driver opens his seatbelt buckle or if the driver opens his door, the transition 4 from the ready state d to the non-ready state c is carried out. Further reasons for the transition to the non-ready state are found in transition 9 below. These reasons likewise cause the transition 4 from the ready state d to the non-ready state c and are only explained further below for the sake of better comprehensibility.

State c, pilot not ready:

The pilot cannot be activated in the non-ready state c. The non-ready state c is indicated to the driver in a suitable manner, for example by means of a pictogram in the combination instrument. If the driver attempts to activate the pilot in the non-ready state, this is not allowed and the failed activation attempt is indicated to the driver optically and/or acoustically in a suitable manner. This can be carried out, for example, by means of a pop-up in the combination instrument and/or a warning tone or tone sequence. If the driver also removes his hands from the steering wheel after a failed activation attempt, he is again given an even more intensive optical and/or acoustic warning and is requested to put his hands on the steering wheel again. The fact of whether or not the driver has his hands on the steering wheel can be detected by measuring the manual steering torque or by means of suitable sensors in the steering wheel, for example pressure sensors or capacitive sensors.

Transition 3:

The transition from the pilot which is not ready to the ready but inactive pilot is carried out if predefined prerequisites for system readiness have been met. If the driver no longer steers sharply and he no longer brakes and drives just as fast as or slower than the maximum permissible maximum speed of the pilot and carries out control in such a manner that the vehicle is completely inside the lane again and if the driver's seatbelt buckle is closed (again) and if the driver's door is closed (again), the system changes to the ready state d. The transition 3 from the non-ready state to the ready state is likewise carried out only when the reasons cited under transition 9 are also no longer present.

Transition 5:

The driver causes the transition 5 to the active pilot mode e by actuating an operating unit, for example a pushbutton or a switch. The transition 5 to the active pilot mode e is indicated to the driver optically and/or acoustically in a suitable manner, for example by means of a pop-up in the combination instrument and/or by means of a tone or a tone sequence. To avoid unintentional activation of the pilot mode e, the system may be configured in such a manner that two operating actions are needed to activate the pilot mode e, for example the simultaneous pressing of two pushbuttons which are integrated in the steering wheel for example, the folding back of a cover cap which makes it possible to actuate a pushbutton or switch, or the grasping and lifting of the gearshift lever with two fingers so that the gearshift lever can be changed from the "on" to the "off" position.

State e:

After activation by the driver, the pilot undertakes the longitudinal and lateral guidance of the vehicle. The state e, pilot active, is indicated to the driver optically, haptically and/or acoustically in a suitable manner, for example by means of a pictogram in the combination instrument in conjunction with a tone or a tone sequence. In the highly automatic and fully automatic as well as the autonomous driving mode, it is also conceivable for the steering wheel to be moved away from the driver using the existing steering wheel adjustment. The driver can leave his hands on the steering wheel and can easily steer along if he wishes to. However, he can also remove his hands from the steering wheel and can move the driver's seat into a more comfortable position.

Transitions 6 and 7:

The driver can leave the active pilot mode e at any time by:
- actuating an operating unit, for example a pushbutton or a switch,
- steering sharply,
- braking, for example in a similar manner to ACC, or
- optionally: kick-down, that is to say the complete flooring of the accelerator pedal.

The leaving of the active pilot mode is indicated to the driver in a suitable manner, for example by means of a pop-up in the combination instrument or by means of a tone or a tone sequence.

In this case, a steering intervention is usually detected by a steering torque sensor. Since the mere grasping of the steering wheel also already induces a steering torque, but this is intended to be enabled in the active pilot mode e if the driver so desires, as described above, it is necessary to set a suitable threshold of the steering torque below which, although the driver can override the system, it does not result in the active pilot mode e being deactivated. Furthermore, this dropping threshold of the manual steering torque can be raised for a short time after activating the pilot mode e since, during the transition from "driver steers" to "pilot steers", the driver possibly still applies high steering torques, which would then immediately result in dropping by the system during activation.

While the braking operation or the possibly sharp steering operation or the kick-down continues, the transition 7 to the non-ready state c is first of all carried out. In this case, no activation readiness is indicated to the driver. After the conclusion of the braking operation, the transition 3 to the ready state d is carried out, which is again indicated to the driver in a suitable manner.

To prevent unintentional deactivation of the pilot mode e, the system can enquire, after one of the driver actions described above, whether the pilot mode e is actually intended to be left, which can be acknowledged by the driver by actuating a pushbutton or switch or by means of a voice input. It is likewise conceivable that two pushbuttons or switches on the steering wheel must be pressed at the same time, as has already been explained above. The system is therefore not immediately switched off after kick-down, a steering and braking intervention, but the driver can always override it.

Transition 8:

A simple transgression by actuating the accelerator pedal is not intended to result in the active pilot mode e being dropped or ended, as is also conventionally carried out in ACC. The transgression results in the transition 8 from the state e, pilot active, to the ready state d and is indicated to the driver in a suitable manner. As soon as the accelerator pedal is no longer actuated, the system automatically changes back to the state e, pilot active.

If the kick-down or the transgression results in a potentially unsafe state, for example severe acceleration in a sharp bend, the system can react to this by outputting a warning and/or not implementing the acceleration request.

Transition 9:

If particular prerequisites for maintaining the active pilot mode e are no longer present, the transition 9 to the state f, escalating driver warning, is carried out. In addition to the causes described for transition 4, the failure of system components, for example the defect in a sensor or a control device and the reaching of system limits, may result in this. Some examples of the reaching of a system limit are cited below:
- the system is designed only for dedicated road classes, for example motorways or motorway-like roads, and the motorway ends in a few kilometers, or only for telematically monitored roads and the telemonitoring ends in a few kilometers, or only for certified roads which meet certain minimum infrastructure requirements and the certified road ends in a few kilometers,
- the system is not designed for journeys in roadworks and there are roadworks a few kilometers ahead,
- the system is not able to carry out a lane change and the vehicle's own lane ends in a few kilometers,
- the system is intended to drive only to a particular exit according to the driver's request and this exit is a few kilometers ahead,
- the system is designed only for a traffic jam following journey and the traffic begins to flow again, which can be detected, for example, by a severe increase in the speed of the vehicle in front,
- the system is not designed for journeys on a smooth road, such as ice, snow or aquaplaning, and the system registers an ESP intervention despite a moderate driving style,
- the system is not designed for journeys in poor visibility and a sensor registers severely restricted visibility,
- the system must detect the lane to be driven along with sufficient quality to laterally guide the vehicle. This is no longer the case as a result of the marking lines being omitted or the road being soiled or poor visibility, or
- the system requires traffic and environmental data to automatically guide the vehicle, which data are supplied via a radio interface, such as vehicle-to-vehicle communication and/or vehicle-to-infrastructure communication, and it is possible to predict that this radio link will soon be interrupted, for example in a radio hole or a tunnel.

The active pilot mode e can also be left if the driver no longer meets his obligations. In the semi-automatic driving mode, the driver must be alert, for example, and must permanently look at the road and the surrounding traffic. In the highly automatic driving mode, the driver is not allowed to sleep, for example. If the system detects that the driver permanently no longer meets these obligations, an escalating driver warning f is effected. The system can detect this by means of suitable sensors for monitoring the driver state, for example an interior camera.

State f:

In the case of the escalating driver warning f, the driver is suitably advised to meet his obligations in the activated pilot mode e. If he still does not do this, he is warned of the imminent deactivation of the pilot mode e or the driver is requested to assume the complete vehicle guidance. If other prerequisites for maintaining the active pilot mode e are no longer met, for example the failure of system components or the reaching of system limits, the driver is directly requested to assume the complete vehicle guidance. If he does not do this, the request to assume the task is made in a more intensive manner. This can be respectively effected optically, acoustically and/or haptically, for example by means of a pictogram in the combination instrument, a warning tone or tone sequence or by means of a brake jerk. In the highly automatic and fully automatic or autonomous driving mode, the steering wheel which has been previously retracted can be extended again and the driver's seat can be changed from the rest position to the driving position again.

Transition 10:

If the driver is advised to meet his obligations in the activated pilot mode e and the driver does not react to this in a suitable manner, the pilot mode e remains active. The driver reacts in a suitable manner if he looks at the road again, for example during semi-automatic driving, or if he refrains from the ancillary activities which are not permissible, for example sleeping, during highly automatic driving.

Transition 11:

If the driver is requested to assume the complete vehicle guidance and the driver reacts to this in a suitable manner, the transition to the non-ready state c is carried out. The driver reacts in a suitable manner if he completely assumes the longitudinal and lateral guidance of the vehicle again.

In this case, the lateral guidance, in particular, is dropped "softly" by slowly ramping down the steering torque, for example, or stopping the automatic lateral guidance only when the driver has his hands on the steering wheel and himself applies a steering torque.

If the driver does not react to the request to assume the task and a minimal risk maneuver is not possible during highly automatic driving on account of the system, the transition to the non-ready state c is likewise carried out.

Transition 12:

If the driver permanently fails to assume the task after a request to assume the task, the vehicle is changed to a minimal risk state, if provided and possible.

State g:

The change to a minimal risk state is carried out by means of a suitable driving maneuver. The selection of this driving maneuver is dependent on the current driving situation. In the case of a traffic jam following journey, deceleration to a standstill in the current lane may be suitable. In the case of an automatic motorway journey at higher speeds, a lane change to the hard shoulder and a subsequent automatic emergency stop on the hard shoulder may be suitable. An emergency call (e-call) may be made when at a standstill. The electrical parking brake can be activated. The hazard lights are or remain activated. The vehicle doors are unlocked to allow rescuers access to the passenger compartment. During the entire maneuver, the driver always has the possibility of overriding the system or terminating the maneuver by intervening in the longitudinal or lateral guidance. If he does this, the termination of the maneuver is indicated to him in a suitable manner, for example by means of a pop-up in the combination instrument in conjunction with a tone or a tone sequence.

Transition 13:

After reaching the minimal risk state in the minimal risk maneuver g state, the system changes to the non-ready state c which is again indicated to the driver in a suitable manner.

States a and b:

The pilot system can be additionally switched to the off a and on b states by means of an operating device, such as a switch or a pushbutton. This results in the transitions 1 and 2 between the states a and b. The on state b and the off state a are again indicated to the driver in a suitable manner, for example by means of a pictogram in the combination instrument. It may be necessary to switch the system on and off if two operating actions are required to activate the system. If this is not the case, the state a and the transitions 1 and 2 may be dispensed with. The system is then always switched on after the ignition has been switched on.

Figure 2:
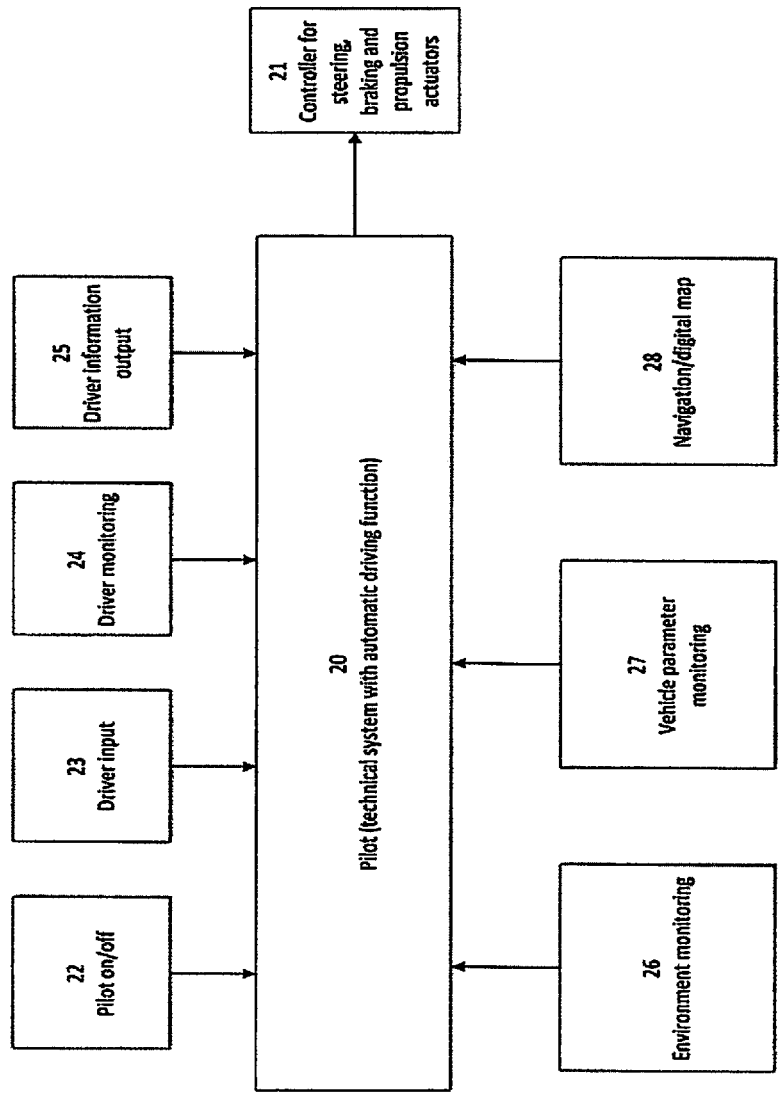
FIG. 2 shows a schematic illustration of the technical system.

FIG. 2 shows, in a schematic block diagram, a disclosed embodiment of an apparatus 20 for carrying out the method described above for activating and deactivating an automatic driving function, that is to say the pilot 20. In this case, the pilot 20 comprises a controller 21 for generating control signals for the steering, braking and propulsion actuators, a device 22 for switching the pilot on/off, a device 23 for driver inputs, a device 24 for driver monitoring, a device 25 for outputting information to the driver, an environment monitoring means 26, a device 27 for determining vehicle parameters and a navigation device 28 including a digital map. In this case, the navigation device 28 may also be designed to receive telematic services.

The document U.S. Pat. No. 8,352,110 B1 describes the activation of an autonomous driving system by the driver with the following sequence:

the driver indicates his willingness to surrender a partial aspect of the vehicle guidance to a control computer by actuating an operating unit, if the control computer is ready to reliably master this partial aspect of the vehicle guidance, this is indicated to the driver, and if the driver lets go of a "force input apparatus", the control computer undertakes this partial aspect of the vehicle guidance.

The document DE 10 2009 033 752 A1 describes a method and an apparatus for switching different functions, in particular the linking of an ACC system to an automatic driving system in a state machine.

The publication Peter Mirwald et al.: "Gestaltung eines Nothalteassistenzsystems bei medizinisch bedingter Fahruntüchtigkeit" [Configuration of an emergency stop assistance system in the event of medically induced incapacity to drive], 5th conference on driver assistance systems: emphasis on networking, TÜV-Süd Akademie, Munich, 15/16 May 2012, describes how a vehicle can be changed to a state which is as safe as possible by means of a suitable emergency stop maneuver if the driver can no longer carry out his driving task, for example on account of a medical emergency. In this case, it is required that the emergency stop maneuver can be overridden or terminated by the driver at any time.

In the Vth final report of the "legal consequences of increasing vehicle automation" project group, ISBN 978-3-86918-189-9 dated January 2012, the following automation spectrum is defined:

Semi-automatic driving means that the longitudinal and lateral guidance is undertaken by the technical system. The driver must permanently monitor the system and must be ready at any time to completely assume the vehicle guidance. Ancillary activities other than driving are not possible.

Highly automatic driving means that the longitudinal and lateral guidance is again undertaken by the technical system, but the driver need not permanently monitor the system. If necessary, the driver is requested by the system to assume the driving task with a sufficient time reserve. If the driver does not assume this task, the system attempts to change the vehicle to a so-called minimal risk state. However, the system is not able to bring about this minimal risk state in all situations. The driver must therefore be able to completely assume the vehicle guidance again after the time reserve has expired. Particular ancillary activities which allow the driver to be quickly brought back into the vehicle guidance are thus enabled. Potential examples are reading and drafting texts, surfing the Internet, etc. However, sleeping is not enabled on account of the long reaction times following a request for the driver to assume the task.

Fully automatic driving means that the longitudinal and lateral guidance is completely undertaken by the system, the driver does not need to permanently monitor the system and the system requests the driver to assume the task with a sufficient time reserve. If the driver does not assume this task, the system is ready to change the vehicle to the so-called minimal risk state in all situations. Since the system is no longer dependent on the driver as a fallback solution, activities other than driving with very long reaction times following a request for the driver to assume the task are enabled, for example sleeping.

All of the above-mentioned degrees of automation apply to dedicated applications which act over a certain period of time in a specific situation. Examples are an automatic traffic jam following journey on the motorway or automatic parking in a parking garage. If, like in a taxi, the entire driving task is carried out by the vehicle from the start to the destination, this is referred to as autonomous driving.

The document DE 10 2005 050 310 A1 describes a method for controlling a vehicle, the method comprising the steps of: identifying at least one input device in the vehicle; providing at least one actuator which is connected to the at least one input device; and controlling the vehicle at least partially on the basis of at least one scheme selected from an interruptible autonomous scheme, a behavior-based autonomous scheme, a selective scheme and a safety scheme.

The document DE 11 2006 002 892 T5 describes a vehicle which can be operated using robotics and has a mechanical vehicle control system which is able to receive manual inputs from a mechanical operating element for operating the vehicle in a manual mode, a controller which is able to generate autonomous control signals, and at least one actuator which is connected to the mechanical vehicle control system by means of at least one electrically actuated clutch, the actuator being set up to receive the autonomous control signals and to operate the mechanical vehicle control system in an autonomous mode.

Furthermore, the document DE 10 2009 048 954 A1 describes a method for automatically operating a vehicle in an autonomous driving mode which does not require any user action, a present traffic situation being detected and a check then being carried out to determine whether the traffic situation satisfies a first criterion. If this criterion is satisfied, a functionality which offers a driver an ancillary activity which does not relate to a driving mode of the vehicle during the autonomous driving mode is blocked.

Furthermore, the document DE 10 2012 002 823 A1 describes a control device having at least two operating states for a vehicle, comprising a changeover apparatus which can be used to change over the control device between the operating states, a first control unit for controlling the steering system of the vehicle, or/and a second control unit for controlling the braking system of the vehicle, the first or/and second control unit controlling the steering system and the braking system of the vehicle on the basis of the operating state of the control device.

Therefore, the disclosed embodiments are further optimize a method and an apparatus for activating or deactivating an automatic driving function of a technical system for assisting the driver of a motor vehicle.

LIST OF REFERENCE SYMBOLS a Pilot off
b Pilot on
c Pilot not ready
d Pilot ready but inactive
e Pilot active
f Escalating warning
g Minimal risk maneuver
1 a→b transition
2 b→a transition
3 c→d transition
4 d→c transition
5 d→e transition
6 e→d transition
7 e→c transition
8 e→d→e transition
9 e→f transition
10 f→e transition
11 f→c transition
12 f→g transition
13 g→c transition
20 Pilot (technical system with automatic driving function)
21 Controller for steering, braking and propulsion actuators
22 Pilot on/off
23 Driver input
24 Driver monitoring
25 Driver information output
26 Environment monitoring
27 Vehicle parameter monitoring
28 Navigation/digital map

The invention claimed is:

1. A method for activating or deactivating an automatic driving function of a technical vehicle piloting system that assists a driver of a motor vehicle, the pilot system having states between which predefined transitions are possible based on predefined conditions, including at least three system states of pilot not ready, pilot ready but inactive, and pilot active, the method comprising:
   in response to a request of the driver, transitioning from the ready but inactive pilot state to the pilot active state;
   in response to a request of the driver, transitioning from the pilot active state to the ready but inactive pilot state;
   in response to a driver braking measure, a steering measure and/or a kick-down measure by the driver, transitioning from the pilot active state to the pilot not ready state;
   in response to a driver braking measure, steering and/or acceleration measure and/or exceeding predefined limit values with respect to vehicle behavior and/or driving behavior, transitioning from the ready but inactive pilot state to the pilot not ready state; and
   in response to predefined pre-requisites for system readiness having been met, transitioning from the pilot not ready state to the ready but inactive pilot state,
   wherein the vehicle pilot system further comprises the further system state of escalating driver warning in which the driver is requested to readopt his driver behavior caused by the automatic driving function or to assume vehicle guidance, and
   wherein the vehicle pilot system further comprises the further system state of minimal risk maneuver, which is used to change the vehicle to a minimal risk state using a suitable driving maneuver.

2. The method of claim 1, wherein the request from the driver is based on detection of the driver actuating an operating unit.

3. The method of claim 1,
   wherein the method further comprises, in response to a determination that the predefined pre-requisites for maintaining the pilot active state are no longer present, transitioning from the pilot active state to the escalating driver warning state.

4. The method of claim 3, wherein the predefined prerequisites are determined based on system limits of the pilot and/or by the non-compliance with a driver behavior required by a pilot active state.

5. The method of claim 3, the method further comprises transitioning from the escalating driver warning state to the pilot active state in response to the driver adapting his driving behavior to the driver behavior determined by the pilot active state within a predefined warning time.

6. The method of claim 3, further comprising transitioning from the escalating driver warning state to the pilot not ready state in response to the driver assuming vehicle guidance.

7. The method of claim 6, wherein the vehicle pilot system further comprises a transition from the escalating driver warning system state to the minimal risk maneuver state being carried out if the driver does not assume the vehicle guidance within a predefined warning time, and a transition from the minimal risk maneuver system state to the pilot not ready system state is performed in response to detection that the vehicle has been changed to a minimal risk state.

8. The method of claim 1, wherein actuation of the accelerator pedal in the pilot active state causes a transition to the pilot ready but inactive state, the transition causing a return to the pilot active state in response to detection that the accelerator pedal is no longer actuated.

9. The method of claim 1, wherein the pilot system has two superordinate system states including a pilot switched on system state and a pilot switched off system state, and a transition of switch on pilot and a transition of switch off pilot being possible between the two system states of pilot switched off and pilot switched on.

10. The method of claim 1, wherein the pilot system comprises at least one of the following automatic driving functions: semi-automatic driving, highly automatic driving, fully automatic driving, autonomous driving, semi-automatic parking, highly automatic parking, fully automatic parking, and autonomous parking.

11. An apparatus that assists a driver of a motor vehicle, the apparatus including a vehicle pilot system being configured to have states between which predefined transitions are possible based on predefined conditions, the states including at least three system states of pilot not ready, pilot ready but inactive state, and pilot active state, the apparatus being further configured to:

transition from a ready but inactive pilot state to the pilot active state in response to a request of the driver;

transition from the pilot active state to the ready but inactive pilot state in response to a request of the driver;

transition from the active pilot state to the pilot not ready state in response to a driver braking measure, a steering measure and/or a kick-down measure by the driver;

transition from the ready but inactive pilot state to the pilot not ready state in response to a driver braking measure, steering and/or acceleration measure and/or exceeding predefined limit values with respect to vehicle behavior and/or driving behavior; and transition from the pilot not ready state to the ready but inactive pilot sate in response to predefined pre-requisites for system readiness having been met, wherein the vehicle pilot system further comprises the further system state of escalating driver warning in which the driver is requested to readopt his driver behavior caused by the automatic driving function or to assume vehicle guidance, and wherein the vehicle pilot system further comprises the further system state of minimal risk maneuver, which is used to change the vehicle to a minimal risk state using a suitable driving maneuver.

12. The apparatus of claim 11, further comprising,
a controller that generates control signals for the steering, braking and propulsion actuators,
a device that switches the pilot system on/off,
a device that receives driver inputs,
a device monitors driver behavior,
a device that outputs information to the driver,
an environment monitoring means,
a device that determines vehicle parameters, and
a navigation device including a digital map.

\* \* \* \* \*